US012769042B2

(12) United States Patent
Stover et al.

(10) Patent No.: US 12,769,042 B2
(45) Date of Patent: Oct. 20, 2026

(54) REFLECTIVE POLARIZER

(71) Applicant: 3M INNOVATIVE PROPERTIES COMPANY, St. Paul, MN (US)

(72) Inventors: Carl A. Stover, St. Paul, MN (US); Adam D. Haag, Woodbury, MN (US); Timothy J. Nevitt, Red Wing, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 548 days.

(21) Appl. No.: 18/256,381

(22) PCT Filed: Nov. 23, 2021

(86) PCT No.: PCT/IB2021/060882

§ 371 (c)(1),
(2) Date: Jun. 7, 2023

(87) PCT Pub. No.: WO2022/136974

PCT Pub. Date: Jun. 30, 2022

(65) Prior Publication Data

US 2024/0111081 A1 Apr. 4, 2024

Related U.S. Application Data

(60) Provisional application No. 63/199,330, filed on Dec. 21, 2020.

(51) Int. Cl.
*G02B 5/30* (2006.01)

(52) U.S. Cl.
CPC .................................... *G02B 5/305* (2013.01)

(58) Field of Classification Search
CPC ...... G02B 5/30; G02B 5/3025; G02B 5/3033; G02B 5/3041; G02B 5/305; G02B 5/3083; G02B 27/28
See application file for complete search history.

(56) References Cited

U.S. PATENT DOCUMENTS 3,610,729 A 10/1971 Rogers
4,446,305 A 5/1984 Rogers et al.
(Continued)

FOREIGN PATENT DOCUMENTS

WO 1995017303 A1 6/1995
WO 1999039224 A1 8/1999
(Continued)

OTHER PUBLICATIONS

International Search Report received for PCT International Application No. PCT/IB2021/060882, mailed on Mar. 2, 2022, 3 pages.
(Continued)

*Primary Examiner* — Stephone B Allen
*Assistant Examiner* — Adam W Booher
(74) *Attorney, Agent, or Firm* — Theresa Stadheim

(57) ABSTRACT

The present disclosure provides a reflective polarizer including a plurality of polymeric first layers and a plurality of polymeric second layers. A plot of an average layer thickness versus a layer number for the pluralities of polymeric first, but not second, layers includes a knee region separating a left region including at least 50 sequentially arranged polymeric first layers. The polymeric first layers have lower layer numbers, and the average layer thickness increases with increasing layer number from a right region including at least 5 sequentially arranged polymeric first layers. The polymeric first layers have higher layer numbers and the average thickness increases with increasing layer number, such that linear fits to the at least 50 sequentially arranged polymeric first layers and to the at least 5 sequentially arranged polymeric first layers have respective positive slopes S1 and S2, S2/S1≥5.

5 Claims, 10 Drawing Sheets

(56) References Cited

U.S. PATENT DOCUMENTS

| | | | |
|---|---|---|---|
| 4,540,623 | A | 9/1985 | Im et al. |
| 5,103,337 | A | 4/1992 | Schrenk et al. |
| 5,360,659 | A | 11/1994 | Arends et al. |
| 5,448,404 | A | 9/1995 | Schrenk et al. |
| 5,882,774 | A | 3/1999 | Jonza et al. |
| 6,157,490 | A | 12/2000 | Wheatley et al. |
| 6,179,948 | B1 | 1/2001 | Merrill et al. |
| 6,368,699 | B1 | 4/2002 | Gilbert et al. |
| 6,531,230 | B1 | 3/2003 | Weber et al. |
| 6,783,349 | B2 | 8/2004 | Neavin et al. |
| 6,916,440 | B2 | 7/2005 | Jackson et al. |
| 11,493,677 | B2 | 11/2022 | Haag et al. |
| 2011/0272849 | A1 | 11/2011 | Neavin et al. |
| 2012/0293742 | A1 | 11/2012 | Banerjee |
| 2014/0240829 | A1 | 8/2014 | Weber et al. |
| 2020/0183065 | A1 | 6/2020 | Haag et al. |
| 2020/0319388 | A1 | 10/2020 | Ambur et al. |
| 2020/0319389 | A1 | 10/2020 | Yun et al. |
| 2021/0215865 | A1 | 7/2021 | Le et al. |

FOREIGN PATENT DOCUMENTS

| | | | | |
|---|---|---|---|---|
| WO | WO-2019123141 A1 * | 6/2019 | ............. | G02B 5/305 |
| WO | WO-2020066666 A1 * | 4/2020 | ............. | B32B 3/263 |

OTHER PUBLICATIONS

Weber, "Giant Birefringent Optics in Multilayer Polymer Mirrors", Science, 2000, vol. 287, pp. 2451-2456.

* cited by examiner

REFLECTIVE POLARIZER

CROSS REFERENCE TO RELATED APPLICATIONS

This application is a national stage filing under 35 U.S.C. 371 of PCT/IB2021/060882, filed Nov. 23, 2021, which claims the benefit of U.S. Application No. 63/199,330, filed Dec. 21, 2020, the disclosures of which are incorporated by reference in their entirety herein.

TECHNICAL FIELD

The present disclosure relates generally to reflective polarizers, and in particular, to reflective polarizers for optical devices.

BACKGROUND

Multi-layer optical films are generally used for fabricating reflective polarizers. The reflective polarizers are widely used in optical devices, such as Virtual Reality (VR) headsets, display devices and the like. Conventional reflective polarizers when used with such optical devices may generate optical artifacts.

SUMMARY

In a first aspect, the present disclosure provides a reflective polarizer. The reflective polarizer includes a plurality of polymeric first layers and a plurality of polymeric second layers. The plurality of polymeric first layers is arranged along a first portion of a thickness of the reflective polarizer. The plurality of polymeric first layers includes a polymeric first end layer at each end thereof. The polymeric first end layers and each layer therebetween have an average layer thickness less than about 300 nanometers (nm). The plurality of polymeric second layers is arranged along a second portion of the thickness of the reflective polarizer. The plurality of polymeric second layers includes a polymeric second end layer at each end thereof. The polymeric second end layers and each layer therebetween have an average layer thickness less than about 300 nm. A plot of the average layer thickness versus a layer number for the pluralities of polymeric first, but not second, layers includes a knee region separating a left region from a right region. The left region includes at least 50 sequentially arranged polymeric first layers. The polymeric first layers in the left region have lower layer numbers, and the average layer thickness increases with increasing layer number. The right region includes at least 5 sequentially arranged polymeric first layers. The polymeric first layers in the right region have higher layer numbers and the average layer thickness increases with increasing layer number, such that linear fits to the at least 50 sequentially arranged polymeric first layers in the left region and to the at least 5 sequentially arranged polymeric first layers in the right region have respective positive slopes S1 and S2, and $S2/S1 \geq 5$.

In a second aspect, the present disclosure provides a reflective polarizer. The reflective polarizer includes a plurality of polymeric first layers, a plurality of polymeric second layers, and at least one intermediate layer. The plurality of polymeric first layers is disposed between a pair of polymeric first end layers. The plurality of polymeric second layers is disposed between a pair of polymeric second end layers. Each layer between the pair of polymeric first end layers and each layer between the pair of polymeric second end layers have an average thickness less than about 300 nm. The at least one intermediate layer has an average thickness greater than about 500 nm and is disposed between the pluralities of polymeric first and second layers. For a first wavelength range extending from about 400 nm to about 700 nm, the pluralities of the polymeric first and second layers, in combination, have, for a first polarization state and an incident angle of less than about 5 degrees, an average optical reflectance of greater than about 95%, an average optical transmittance of less than about 1%, and an average optical absorption of less than about 1%. For the first wavelength range extending from about 400 nm to about 700 nm, the pluralities of the polymeric first and second layers, in combination, have, for an orthogonal second polarization state and an incident angle of between about 55 degrees to about 65 degrees, an average optical transmittance of greater than about 95%, an average optical reflectance of less than about 1%, and an average optical absorption of less than about 1%. For the first wavelength range extending from about 400 nm to about 700 nm, the pluralities of the polymeric first and second layers, in combination, have, for the first polarization state and an incident angle of between about 55 degrees to about 65 degrees, an average optical reflectance of greater than about 85%.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
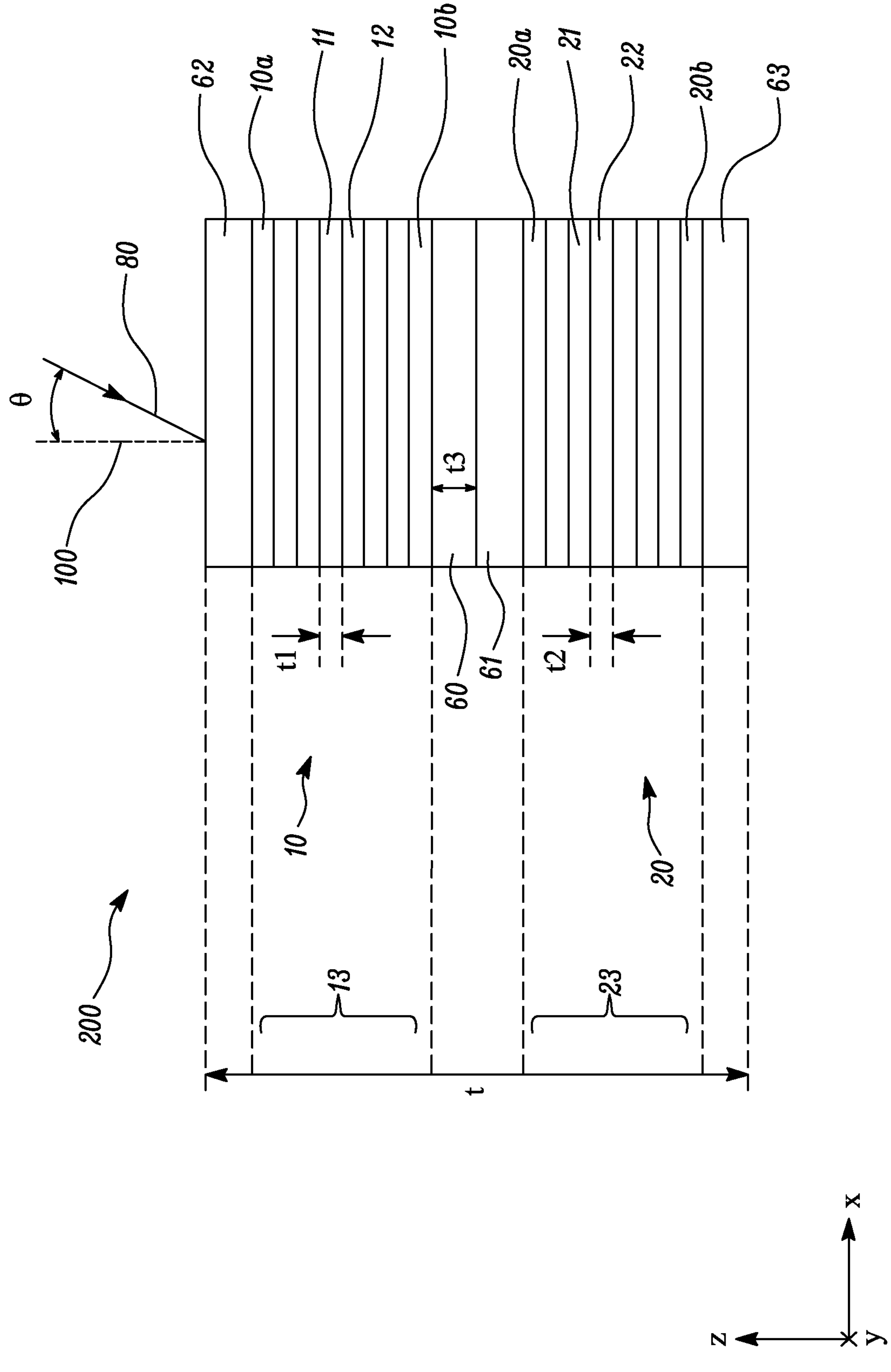
FIG. 1 shows a sectional schematic view of a reflective polarizer, according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

As used herein, the term "block polarization state" refers to a polarization state when an optical device reflects or absorbs a relatively large amount of an incident light.

As used herein, the term "pass polarization state" refers to a polarization state when an optical device transmits a relatively large amount of an incident light.

The present disclosure provides a reflective polarizer. Exemplary applications of the reflective polarizers of the present disclosure include display devices, such as liquid crystal displays (LCDs) in mobile telephones, personal data assistants, computers, televisions, and other optical devices. The reflective polarizers of the present disclosure may also be used in Virtual Reality (VR) head-sets.

In some examples, optical film may be fabricated by coextrusion. The fabrication method may comprise: (a) providing at least a first and a second stream of resin corresponding to the first and second polymers to be used in the finished film; (b) dividing the first and the second streams into a plurality of layers using a suitable feedblock, such as one that comprises: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film.

After cooling, the multilayer web can be re-heated and drawn or stretched to produce the near-finished multilayer optical film. The drawing or stretching accomplishes two goals: it thins the layers to their desired final thicknesses profile, and it orients the layers such that at least some of the layers become birefringent. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

The polymers of the various layers are preferably chosen to have similar rheological properties, e.g., melt viscosities, so that they can be co-extruded without significant flow disturbances. Extrusion conditions may be chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

The multilayer optical films can be made using any suitable light-transmissive materials, but in many cases, it is beneficial to use low absorption polymer materials. With such materials, absorption of a microlayer stack over visible and infrared wavelengths can be made small or negligible, such that the sum of reflection and transmission for the stack (or an optical film of which it is a part), at any given wavelength and for any specified angle of incidence and polarization state, is approximately 100%, i.e., $R+T \approx 100\%$, or $R \approx 100\%-T$. Exemplary multilayer optical films are composed of polymer materials and may be fabricated using coextruding, casting, and orienting processes. Reference is made to U.S. Pat. No. 5,882,774 (Jonza et al.) "Optical Film", U.S. Pat. No. 6,179,948 (Merrill et al.) "Optical Film and Process for Manufacture Thereof", U.S. Pat. No. 6,783,349 (Neavin et al.) "Apparatus for Making Multilayer Optical Films", and patent application publication US 2011/0272849 (Neavin et al.) "Feedblock for Manufacturing Multilayer Polymeric Films".

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. Thicker layers may be included, such as skin layers at the outer surfaces of the multilayer optical film, or protective boundary layers (PBLs) disposed within the multilayer optical films, that separate coherent groupings (referred to herein as "packets") of microlayers.

For polarizing applications, e.g., for reflective polarizers, at least some of the optical layers are formed using birefringent polymers, in which the polymer's index of refraction has differing values along orthogonal Cartesian axes of the polymer. Generally, birefringent polymer microlayers have their orthogonal Cartesian axes defined by the normal to the layer plane (z-axis), with the x-axis and y-axis lying within the layer plane. Birefringent polymers can also be used in non-polarizing applications.

In some cases, the microlayers have thicknesses and refractive index values corresponding to a ¼-wave stack, i.e., arranged in optical repeat units or unit cells each having two adjacent microlayers of equal optical thickness (f-ratio=50%), such optical repeat unit being effective to reflect by constructive interference light whose wavelength λ is twice the overall optical thickness of the optical repeat unit. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. For example, a UV absorbing layer can be added at the incident side of the film to protect components from degradation caused by UV light. The multilayer optical films can be attached to mechanically reinforcing layers using a UV-curable acrylate adhesive or other suitable material. Such reinforcing layers may comprise polymers such as PET or polycarbonate, and may also include structured surfaces that provide optical function such as light diffusion or collimation, e.g. by the use of beads or prisms. Additional layers and coatings can also include scratch resistant layers, tear resistant layers, and stiffening agents. See, e.g., U.S. Pat. No. 6,368,699 (Gilbert et al.). Methods and devices for making multilayer optical films are discussed in U.S. Pat. No. 6,783,349 (Neavin et al.).

The reflective and transmissive properties of multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present patent application, unless otherwise specified, the x-, y-, and z-axes are assumed to be local Cartesian coordinates applicable to any point of interest on a multilayer optical film, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{ij} - n_{22}$, where j=x, y, or z and where the layer designations 1, 2 are chosen so that $n_{1x} \geq n_{2x}$, i.e., $\Delta n_x \geq 0$.

In practice, the refractive indices are controlled by judicious materials selection and processing conditions. A multilayer film is made by co-extrusion of a large number, e.g. tens or hundreds of layers of two alternating polymers A, B, sometimes followed by passing the multilayer extrudate through one or more multipliers, and then stretching or otherwise orienting the extrudate to form a final film. The resulting film is typically composed of hundreds of individual microlayers whose thicknesses and refractive indices are tailored to provide one or more reflection bands in desired region(s) of the spectrum, such as in the visible or near infrared. To achieve a specific target reflectivities with a reasonable number of layers, adjacent microlayers typically exhibit a difference in refractive index ($\Delta n_x$) for light polarized along the x-axis of at least 0.04. In some embodiments, materials are selected such that the difference in refractive index for light polarized along the x-axis is as high as possible after orientation. If the high reflectivity is desired for two orthogonal polarizations, then the adjacent microlayers also can be made to exhibit a difference in refractive index ($\Delta n_y$) for light polarized along the y-axis of at least 0.05.

Optical modeling of multilayer optical films is computationally intensive, but well understood given that each layer's indices of refraction and thickness are known. From a known set of refraction values and thicknesses, an optical spectrum for transmission and reflection of each polarization state may be rigorously calculated based on well-known optical principles and multilayer modelling technique commonly referred to as Transfer Matrix Methods. By comparing the calculated optical spectrum to the measured optical spectrum from the fabricated multilayer optical films, we may iteratively determine corrections to layer parameters until the modelled result for the optical spectrum best matches the experimentally measured optical spectrum. By this iterative modelling method, the optical parameters for indices of refraction and layer thickness may be determined from the measured optical spectrum of a multilayer optical film with a high degree of confidence.

The '774 (Jonza et al.) patent referenced above describes, among other things, how the refractive index difference ($\Delta n_z$) between adjacent microlayers for light polarized along the z-axis can be tailored to achieve desirable reflectivity properties for the p-polarization component of obliquely incident light. To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 * \Delta n_x$, or $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

The '774 (Jonza et al.) patent also discusses certain design considerations relating to multilayer optical films configured as polarizers, referred to as multilayer reflecting or reflective polarizers. In general, the transmission of any reflective polarizer is dependent on the polarization of the incident light and the azimuthal orientation of that light with respect to the principal axes of the polarizer. In many applications, the ideal reflecting polarizer has high reflectance along one axis (the "extinction" or "block" axis) and zero reflectance along the other axis (the "transmission" or "pass" axis). For the purposes of this application, light whose polarization state is substantially aligned with the pass axis or transmission axis is referred to as pass light and light whose polarization state is substantially aligned with the block axis or extinction axis is referred to as block light. Unless otherwise indicated, pass light at 60° incidence is measured in p-polarized pass light along the pass axis of the reflecting polarizer. If some reflectivity occurs along the transmission axis, the contrast of the polarizer at off-normal angles may be reduced, and if the reflectivity is different for various wavelengths, color may be introduced into the transmitted light. Furthermore, exact matching of the two y indices and the two z indices may not be possible in some multilayer systems, and if the z-axis indices are not matched, introduction of a slight mismatch may be desired for in-plane indices n1y and n2y. In particular, by arranging the y-index mismatch to have the same sign as the z-index mismatch, a Brewster effect is produced at the interfaces of the microlayers, to minimize off-axis reflectivity, and therefore off-axis color, along the transmission axis of the multilayer reflecting polarizer.

The reflective polarizer of the present disclosure includes a plurality of polymeric first layers and a plurality of polymeric second layers. The plurality of polymeric first layers is arranged along a first portion of a thickness of the reflective polarizer. The plurality of polymeric first layers includes a polymeric first end layer at each end thereof. The first end layers and each layer therebetween have an average layer thickness less than about 300 nanometers (nm). The plurality of polymeric second layers is arranged along a second portion of the thickness of the reflective polarizer. The plurality of polymeric second layers includes a polymeric second end layer at each end thereof. The second end layers and each layer therebetween have an average layer thickness less than about 300 nm. A plot of the average layer thickness versus a layer number for the pluralities of polymeric first, but not second, layers includes a knee region separating a left region from a right region. The left region includes at least 50 sequentially arranged polymeric first layers. The right region includes at least 5 sequentially arranged polymeric first layers. The polymeric first layers in the left region have lower layer numbers and the average layer thickness increases with increasing layer number. The polymeric first layers in the right region have higher layer numbers and the average layer thickness increases with increasing layer number. Linear fits to the at least 50 sequentially arranged polymeric first layers in the left region and to the at least 5 sequentially arranged polymeric first layers in the right region have respective positive slopes S1 and S2, $S2/S1 \geq 5$.

The pluralities of polymeric first and second layers may be co-extruded and co-stretched in a transverse direction (TD) during a process of manufacturing the reflective polarizer. While stretching the pluralities of polymeric first and second layers in the TD, the pluralities of polymeric first and second layers may be relaxed or may have zero tension in a machine direction (MD) and a normal direction (ND). Each of the pluralities of polymeric first and second layers form alternating A and B polymeric layers. The relaxation in non-stretch directions, such as the MD and the ND, may allow indices of the alternating A and B polymeric layers to match very closely in the MD and the ND. The close matching of the indices of the alternating A and B polymeric layers in the MD and the ND may provide a very low reflectivity in a pass polarization state and a large difference between the indices of the alternating A and B polymeric layers in the TD may provide a very low transmissivity in a block polarization state of the reflective polarizer. Matching of the indices of the alternating A and B polymeric layers in the MD and ND may further provide a very low reflectivity in a pass polarization state of an obliquely incident or off-axis light.

One main concern for adoption of conventional reflective polarizers in optical devices is ghosting. Ghosting refers to generation of "ghost images" in a viewed image. Ghost images typically appear as secondary images in the viewed image that are slightly displaced from a primary image. Further, conventional optical devices may have a low contrast ratio and a low efficiency.

The reflective polarizer of the present disclosure with the very low reflectivity in the pass polarization state and the very low transmissivity in the block polarization state may substantially reduce optical artifacts, such as ghosting in the optical devices. The reflective polarizer with the very low reflectivity in the pass polarization state and the very low transmissivity in the block polarization state may also increase a contrast ratio of the optical devices. The very low reflectivity in the pass polarization state and the very low transmissivity in the block polarization state may further improve an efficiency of the optical devices.

Another concern for adoption of conventional reflective polarizers in the optical devices is wrinkling of the conventional reflective polarizers. The wrinkling of the conventional reflective polarizers occurs while the pluralities of polymeric first and second layers are being stretched in the TD. A wrinkle-free reflective polarizer with the very low reflectivity in the pass polarization state and the very low transmissivity in the block polarization state may be used in high performance optical applications, such as in the VR head-sets.

Referring now to figures, FIG. 1 is a sectional schematic view of an exemplary reflective polarizer 200. The reflective polarizer 200 includes a plurality of polymeric first layers 10, and a plurality of polymeric second layers 20.

The reflective polarizer 200 defines three mutually orthogonal axes x, y, and z. The x and y-axes are in-plane axes of the reflective polarizer 200, while the z-axis is a transverse axis disposed along a thickness t of the reflective polarizer 200. In other words, the x and y-axes are disposed along a plane of the reflective polarizer 200, while the z-axis is perpendicular to the plane of the reflective polarizer 200.

In some embodiments, the thickness t of the reflective polarizer 200 may be greater than about 50 micrometers (μm), greater than about 100 micrometer, greater than about 200 μm, greater than about 300 μm or greater than about 400 μm. However, the thickness t of the reflective polarizer 200 may be varied as per desired application attributes.

The plurality of polymeric first layers 10 is arranged along a first portion 13 of the thickness t of the reflective polarizer 200. The plurality of polymeric first layers 10 includes alternating polymeric first layers 11, 12. The plurality of polymeric first layers 10 further includes a polymeric first end layer 10*a*, 10*b* at each end thereof. In other words, the plurality of polymeric first layers 11, 12 is disposed between a pair of polymeric first end layers 10*a*, 10*b*. As shown in FIG. 1, the polymeric first end layer 10*a* is disposed at one end of the plurality of polymeric first layers 10 and the polymeric first end layer 10*b* is disposed at another end of the plurality of polymeric first layers 10, opposite to the one end.

The first end layers 10*a*, 10*b* and each layer 11, 12 therebetween has an average layer thickness t1 less than about 300 nm. The average layer thickness t1 is interchangeably referred to herein as "the average thickness t1". Specifically, each of the first end layers 10*a*, 10*b* has the average thickness t1 less than 300 nm. Further, each layer 11, 12 between the pair of polymeric first end layers 10*a*, 10*b* has the average thickness t1 of less than about 300 nm. In some embodiments, the average thickness t1 may be less than about 250 nm, less than about 200 nm, or less than about 100 nm. However, the average thickness t1 may be varied as per on desired application attributes. In some cases, atomic force microscopy may be used to measure the average thickness t1.

The plurality of polymeric second layers 20 is arranged along a second portion 23 of the thickness t of the reflective polarizer 200. The plurality of polymeric second layers 20 includes alternating polymeric second layers 21, 22. The plurality of polymeric second layers 20 further includes a polymeric second end layer 20*a*, 20*b* at each end thereof. In other words, the plurality of polymeric second layers 21, 22 is disposed between a pair of polymeric second end layers 20*a*, 20*b*. As shown in FIG. 1, the polymeric second end layer 20*a* is disposed at one end of the plurality of polymeric second layers 20 and the polymeric second end layer 20*b* is disposed at another end of the plurality of polymeric second layers 20, opposite to the one end.

The second end layers 20*a*, 20*b* and each layer 21, 22 therebetween has an average layer thickness t2 of less than about 300 nm. The average layer thickness t2 is interchangeably referred to herein as "the average thickness t2". Specifically, each of the polymeric second end layers 20*a*, 20*b* has the average thickness t2 of less than about 300 nm. Further, each layer 21, 22 between the pair of polymeric second end layers 20*a*, 20*b* has the average thickness t2 of less than about 300 nm. In some embodiments, the average thickness t2 may be less than about 250 nm, less than about 200 nm, or less than about 100 nm. However, the average thickness t2 may be varied as per desired application attributes. In some cases, atomic force microscopy may be used to measure the average thickness t2.

In some embodiments, the reflective polarizer 200 further includes at least one intermediate layer 60, 61 disposed between the pluralities of polymeric first and second layers 10, 20. The at least one intermediate layer 60, 61 may join the pluralities of polymeric first and second layers 10, 20 to each other.

In some embodiments, the at least one intermediate layer 60, 61 has an average thickness t3. In some embodiments, the average thickness t3 is greater than about 500 nm. In some embodiments, the at least one intermediate layer 60, 61 has the average thickness t3 of greater than about 550 nm, greater than about 575 nm, or greater than about 600 nm. However, the average thickness t3 may vary as per application attributes. In some embodiments, material used in the at least one intermediate layer 60, 61 may vary as per application attributes. In some embodiments, each of the at least one intermediate layers 60, 61 is made of an isotropic material. In some embodiments, each of the at least one intermediate layers 60, 61 includes polyethylene terephthalate (PET). In some cases, atomic force microscopy may be used to measure the average thickness t3.

In some embodiments, the reflective polarizer 200 further includes at least one skin layer 62, 63. In some embodiments, each skin layer 62, 63 is disposed on a same side of the pluralities of polymeric first and second layers 10, 20. The at least one skin layer 62, 63 may act as a protective boundary layer (PBL) for the reflective polarizer 200. In some embodiments, the at least one skin layer 62, 63 may be coextruded on one or both major surfaces of the reflective polarizer 200. In the illustrated embodiment of FIG. 1, the reflective polarizer 200 includes two skin layers 62, 63. Specifically, the skin layer 62 is disposed adjacent to the polymeric first end layer 10*a* and the skin layer 63 is disposed adjacent to the polymeric second end layer 20*b*. In other words, the reflective polarizer 200 includes one skin layer 62, 63 on both the major surfaces of the reflective polarizer 200. However, in some other embodiments, the reflective polarizer 200 may include only one skin layer. For example, the reflective polarizer 200 may include any one of the skin layers 62, 63.

In some embodiments, each skin layer 62, 63 has an average thickness of greater than about 500 nm. In some embodiments, each skin layer 62, 63 has the average thickness of greater than about 550 nm, greater than about 575 nm, or greater than about 600 nm. However, the average thickness of the skin layers 62, 63 may be varied as per desired application attributes.

In some embodiments, each of the skin layers 62, 63 is made of an isotropic material. In some embodiments, each of the skin layers 62, 63 includes polyethylene terephthalate (PET). In some embodiments, the skin layers 62, 63 may be substantially similar to one another. In some other embodiments, the skin layers 62, 63 may be different from one another.

The skin layers 62, 63 are optional and in some cases, the reflective polarizer 200 may not include any additional skin layers.

FIG. 1 further illustrates an incident light 80 incident on an outer surface (air-polymer interface) of the reflective polarizer 200 at an incident angle θ. Specifically, the incident light 80 is incident on the skin layer 62 of the reflective polarizer 200 at the incident angle θ. The incident angle θ is measured with respect to a normal 100 to the reflective polarizer 200. In some embodiments, a range of the incident angle θ may be from about 0 degree to about 90 degrees. In some embodiments, the incident angle θ may be less than about 5 degrees. In some embodiments, the incident angle θ may be between about 55 degrees to about 65 degrees.

In some embodiments, each of the pluralities of polymeric first and second layers 10, 20 includes at least 200 layers. Each layer of the polymeric first and second layers 10, 20 has the average thickness t1 or t2 less than 300 nm. In some embodiments, the plurality of polymeric first layers 10 may include at least 200 polymeric first layers 11, 12 and the plurality of polymeric second layers 20 may include at least 200 polymeric second layers 21, 22. In some other embodiments, each of the pluralities of polymeric first and second layers 10, 20 may include at least 325 layers. In some other embodiments, each of the pluralities of polymeric first and second layers 10, 20 may include at least 350 layers.

In some embodiments, the reflective polarizer 200 may include equal number of the polymeric first layers 11, 12 and the polymeric second layers 21, 22. In some other embodiments, the reflective polarizer 200 may include a different number of the polymeric first layers 11, 12 and the polymeric second layers 21, 22. The number of the polymeric first layers 11, 12 and the number of the polymeric second layers 21, 22 in the reflective polarizer 200 may be varied as per desired application attributes.

In some embodiments, the pluralities of polymeric first and second layers 10, 20 are formed integrally with one another. However, in some other embodiments, the pluralities of polymeric first and second layers 10, 20 may be formed separately from one another. In some embodiments, the pluralities of polymeric first and second layers 10, 20 are co-extruded. In some embodiments, the pluralities of polymeric first and second layers 10, 20 are co-extruded and co-stretched.

In some embodiments, the pluralities of polymeric first and second layers 10, 20 may be co-stretched in a transverse direction (TD) during a process of manufacturing the reflective polarizer 200. While stretching the pluralities of polymeric first and second layers 10, 20 in the TD, the pluralities of polymeric first and second layers 10, 20 may be relaxed or may have zero tension in a machine direction (MD) and a normal direction (ND). The TD, the MD, and the ND may be disposed along the x-axis, the y-axis, and the z-axis, respectively. The MD may be a general direction along which the pluralities of polymeric first and second layers 10, 20 travels during a stretching process. The TD may be a second axis within a plane of the pluralities of polymeric first and second layers 10, 20 and may be orthogonal to the MD. The ND may be orthogonal to both the MD and the TD, and corresponds generally to the average thicknesses t1, t2 of the pluralities of polymeric first and second layers 10, 20. The pluralities of polymeric first and second layers 10, 20 may be relaxed or non-stretched in the MD and the ND.

In some embodiments, each of the pluralities of polymeric first and second layers 10, 20 form alternating 'A' and 'B' polymeric layers. In some embodiments, the alternating 'A' and 'B' polymeric layers are interdigitated. In some embodiments, the polymeric first layers 11 and the polymeric second layers 21 are the 'A' polymeric layers, and the polymeric first layers 12 and the polymeric second layers 22 are the 'B' polymeric layers.

Each 'A' and 'B' polymeric layers has an index nx along a first polarization state, an index ny along an orthogonal second polarization state, and an index nz along the z-axis orthogonal to the first and second polarization states. The index nx is defined along the x-axis, the index ny is defined along the y-axis, and the index nz is defined along the z-axis. In some embodiments, the first polarization state is defined along the x-axis, while the second polarization state is defined along the y-axis. The z-axis is therefore orthogonal to the first and second polarization states. In some embodiments, the first polarization state may be a P-polarization state, while the second polarization state may be a S-polarization state. In some other embodiments, the first polarization state may be the S-polarization state, while the second polarization state may be the P-polarization state. In some embodiments, the first polarization state may be a block polarization state (BS). Further, the orthogonal second polarization state may be a pass polarization state (PS).

Each 'A' polymeric layer is isotropic. In other words, indices of each 'A' polymeric layer along the x-, y-, and z-axes, respectively, are all substantially matched. In other words, the index nx, the index ny and the index nz of the 'A' polymeric layers are substantially matched. Two indices are considered to be substantially matched if the difference between the two indices is less than about 0.05, less than about 0.02, or less than about 0.01. Therefore, no pair of indices of each 'A' polymeric layer may differ by more than 0.05.

In some embodiments, the refractive index of each of the 'A' polymeric layers is about 1.57. In some embodiments, nx, ny, nz for each 'A' polymeric layer is substantially less than or equal to 1.57±0.05.

Each 'B' polymeric layer is birefringent. In other words, at least one of indices of each 'B' polymeric layer along the x-, y-, and z-axes, respectively, is different from the others. In other words, at least one of the index nx, the index ny and the index nz of the 'B' polymeric layers is different from the others. Therefore, at least a pair of indices of each 'B' polymeric layer differs by more than 0.05.

In some embodiments, the 'A' polymeric layers include a polycarbonate (PC) and a copolyester (coPET). Each of the 'A' polymeric layers may include a copolymer of the polycarbonate and the copolyester. In some embodiments, the 'A' polymeric layers include a blend of the polycarbonate and the copolyester (PC:coPET) having a molar ratio of 42.5 mol % PC and 57.5 mol % coPET. However, the 'A' polymeric layers may include any other isotropic material based on desired application attributes. In some embodiments, the 'A' polymeric layers may include any isotropic material which remains substantially isotropic upon uniaxial orientation.

In some embodiments, the 'B' polymeric layers include a polyethylene naphthalate (PEN) and a polyethylene terephthalate (PET). Each 'B' polymeric layer may include a copolymer of the polyethylene naphthalate and the polyethylene terephthalate. In some embodiments, the 'B' polymeric layers include a blend of the polyethylene naphthalate and the polyethylene terephthalate having a molar ratio of 90 mol % PEN and 10 mol % PET, also known as low melt polyethylene naphthalate (LMT PEN). Other polymers suitable for use in the 'B' polymeric layers may include, for example, polybutylene 2,6-naphthalate (PBN), and copolymers thereof. However, the 'B' polymeric layers may include any other birefringent material based on desired application attributes.

Each of the 'A' and 'B' polymeric layers has the average thickness of less than about 300 nm. The average thickness of each of the 'A' and 'B' polymeric layers is determined by measuring a thickness of each 'A' and 'B' polymeric layer pair (also known as an optical repeat unit (ORU) using AFM and assuming 'A' and 'B' polymeric layers have a same thickness for each 'A' and 'B' polymeric layer pair. Specifically, the average thickness of each of the 'A' and 'B' polymeric layers is determined as half of the thickness of each 'A' and 'B' polymeric layer pair, i.e., $(t_A+t_B)/2$, where $t_A$ and $t_B$ are thicknesses of the 'A' and 'B' polymeric layers of the 'A' and 'B' polymeric layer pair, respectively. The relaxation in non-stretch directions, such as the MD and the ND, may allow indices of the pluralities of polymeric first and second layers 10, 20, forming the alternating A and B polymeric layers, to match very closely in the MD and the ND. The close matching of the indices of the alternating A and B polymeric layers in the MD and the ND may provide a very low reflectivity in the pass polarization state and a large difference between the indices of the alternating A and B polymeric layers in the TD may provide a very low transmissivity in the block polarization state of the reflective polarizer. Matching of the indices of the alternating A and B polymeric layers in the MD and the ND may further provide a very low reflectivity in the pass polarization state of an off-angle or obliquely incident or off-axis light.

The isotropic material of the 'A' polymeric layers may be chosen, such that after stretching the 'A' and 'B' polymeric layers, the indices ny and nz of the 'A' polymeric layers in the two non-stretch directions (such as, the MD and the ND) remain substantially matched with the respective indices ny and nz of the birefringent material of the 'B' polymeric layers in the non-stretch directions. Further, the indices nx of the 'A' and 'B' polymeric layers have a substantial mismatch in the stretch direction (such as, the TD).

Figure 2:
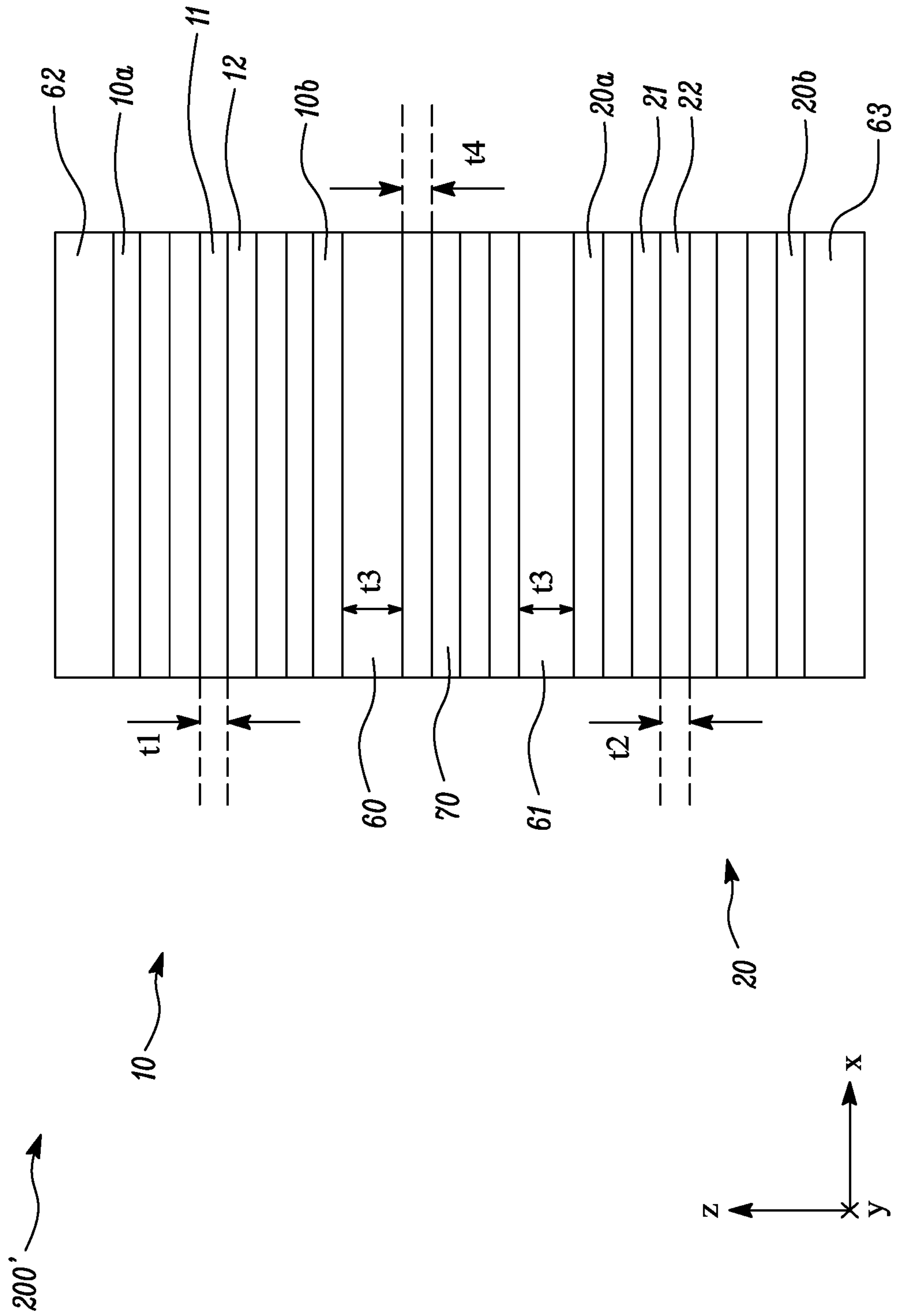
FIG. 2 shows a sectional schematic view of a reflective polarizer, according to another embodiment of the present disclosure.

FIG. 2 shows a sectional schematic view of another exemplary reflective polarizer 200'. The reflective polarizer 200' is substantially similar to the reflective polarizer 200 illustrated in FIG. 1. The reflective polarizer 200' includes the pluralities of polymeric first and second layers 10, 20, and the at least one skin layer 62, 63 similar to the reflective polarizer 200. However, the reflective polarizer 200' includes at least two intermediate layers 60, 61. Each of the at least two intermediate layers 60, 61 has the average thickness t3 greater than about 500 nm. The at least two intermediate layers 60, 61 are disposed between the pluralities of polymeric first and second layers 10, 20. The reflective polarizer 200' further includes polymeric third layers 70 disposed between the at least two intermediate layers 60, 61. In some embodiments, the reflective polarizer 200' includes between one and 10 of the polymeric third layers 70 disposed between the at least two intermediate layers 60, 61. In some embodiments, a number of the polymeric third layers 70 disposed between the at least two intermediate layers 60, 61 may be between 2 and 5, between 4 and 7, between 6 and 9, or as per desired application attributes. Each polymeric third layer 70 has an average thickness t4 of less than about 300 nm. In some embodiments, each polymeric third layer 70 may have the average thickness t4 of less than about 270 nm, less than about 250 nm, less than about 200 nm, or less than about 150 nm. In some cases, atomic force microscopy may be used to measure the average thickness t4 of each polymeric third layer 70 of the reflective polarizer 200'.

In some embodiments, each polymeric third layer 70 is made of an isotropic material. In some embodiments, each polymeric third layer 70 includes polyethylene terephthalate (PET).

Referring to FIGS. 1 and 2, the average layer thicknesses t1 and t2 of the polymeric first layers 11, 12 and the polymeric second layers 21, 22 may depend upon a layer number of the polymeric first layers 11, 12 and the polymeric second layers 21, 22. Exemplary variations between the average layer thicknesses t1 and t2 and the layer numbers of the polymeric first layers 11, 12 and the polymeric second layers 21, 22 are illustrated in FIGS. 3A-3B and 4A-4B and explained in detail below.

Figure 3B:
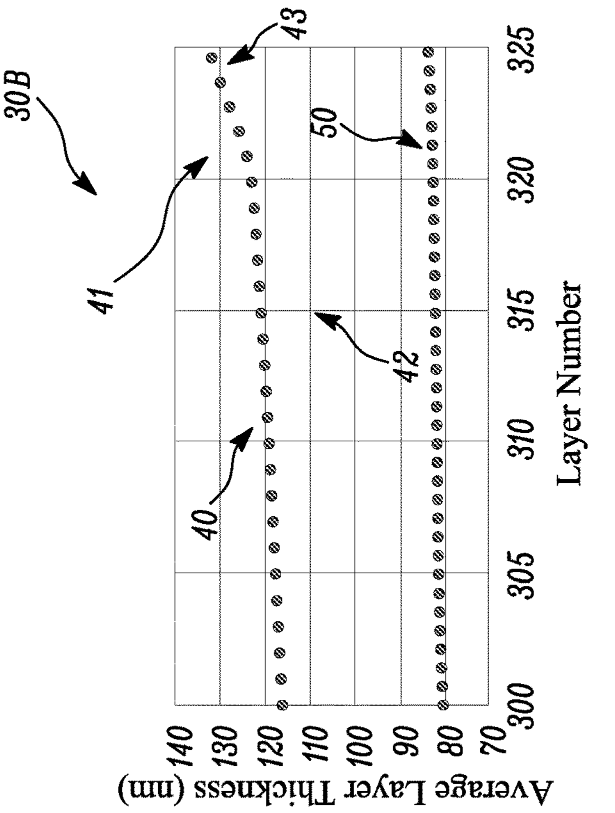
FIG. 3B shows another graph illustrating an enlarged portion of the plots of FIG. 3A.
Figure 3A:
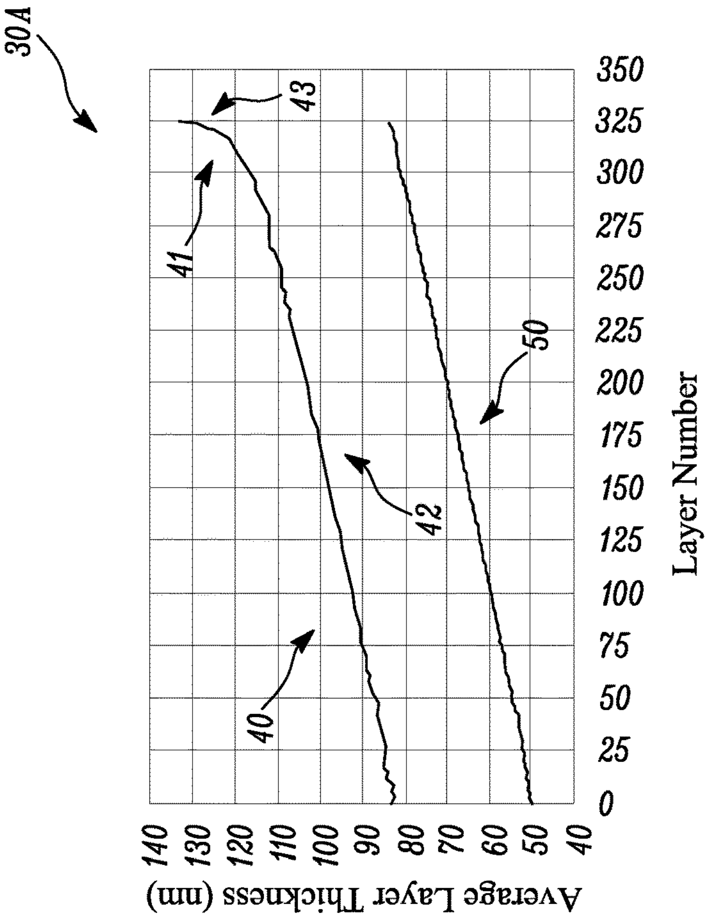
FIG. 3A shows a graph including plots between an average layer thickness and a layer number of polymeric first and second layers of the reflective polarizer.

FIG. 3A shows an exemplary graph 30A. The graph 30A illustrates average layer thickness from nm to 140 nm on an axis of ordinates and layer number from 0 to 350 on an axis of abscissas. The graph 30A includes a plot 40 and a plot 50.

FIG. 3B illustrates an exemplary graph 30B. The graph 30B shows an enlarged portion of the graph 30A. Specifically, the graph 30B illustrates the average layer thickness from 70 nm to 140 nm on an axis of ordinates and the layer number from 300 to 325 on an axis of abscissas.

Referring to FIGS. 1, and 3A-3B, the plot 40 is a curve of the average layer thickness t1 versus a layer number for the plurality of polymeric first layers 10. The plot 40 includes a knee region 41, a left region 42, and a right region 43. The knee region 41 separates the left region 42 from the right region 43. The knee region 41 may be defined as a region of the plot 40, beyond which a rate of increase of the average layer thickness t1 of the plurality of polymeric first layers 10 relative to the layer number is substantially greater than a rate of increase of the average layer thickness t1 of the plurality of polymeric first layers 10 prior to the knee region 41.

The left region 42 includes at least 50 sequentially arranged polymeric first layers 11, 12. In some embodiments, the left region 42 may include at least 100 sequentially arranged polymeric first layers 11, 12. In some embodiments, the left region 42 may include at least 150, at least 200, at least 250, or at least 300 sequentially arranged polymeric first layers 11, 12.

The polymeric first layers 11, 12 in the left region 42 have lower layer numbers and the average layer thickness t1 of the polymeric first layers 11, 12 in the left region 42 increases with increasing layer number.

The right region 43 includes at least 5 sequentially arranged layers of the polymeric first layers 11, 12. In some embodiments, the right region 43 may include at least 10, at least 15, at least 20, at least 25, or at least 30 sequentially arranged layers of the polymeric first layers 11, 12. The polymeric first layers 11, 12 in the right region 43 have higher layer numbers and the average layer thickness t1 of the polymeric first layers 11, 12 in the right region 43 increases with increasing layer number.

The plot 50 is a curve of the average layer thickness t2 versus a layer number of the plurality of polymeric second layers 20. The plot 50 does not include a knee region. In this embodiment, the plot 50 is substantially linear. The plot 50 further depicts that the average layer thickness t2 gradually increases with increasing layer number of the plurality of polymeric second layers 20.

Figure 4A:
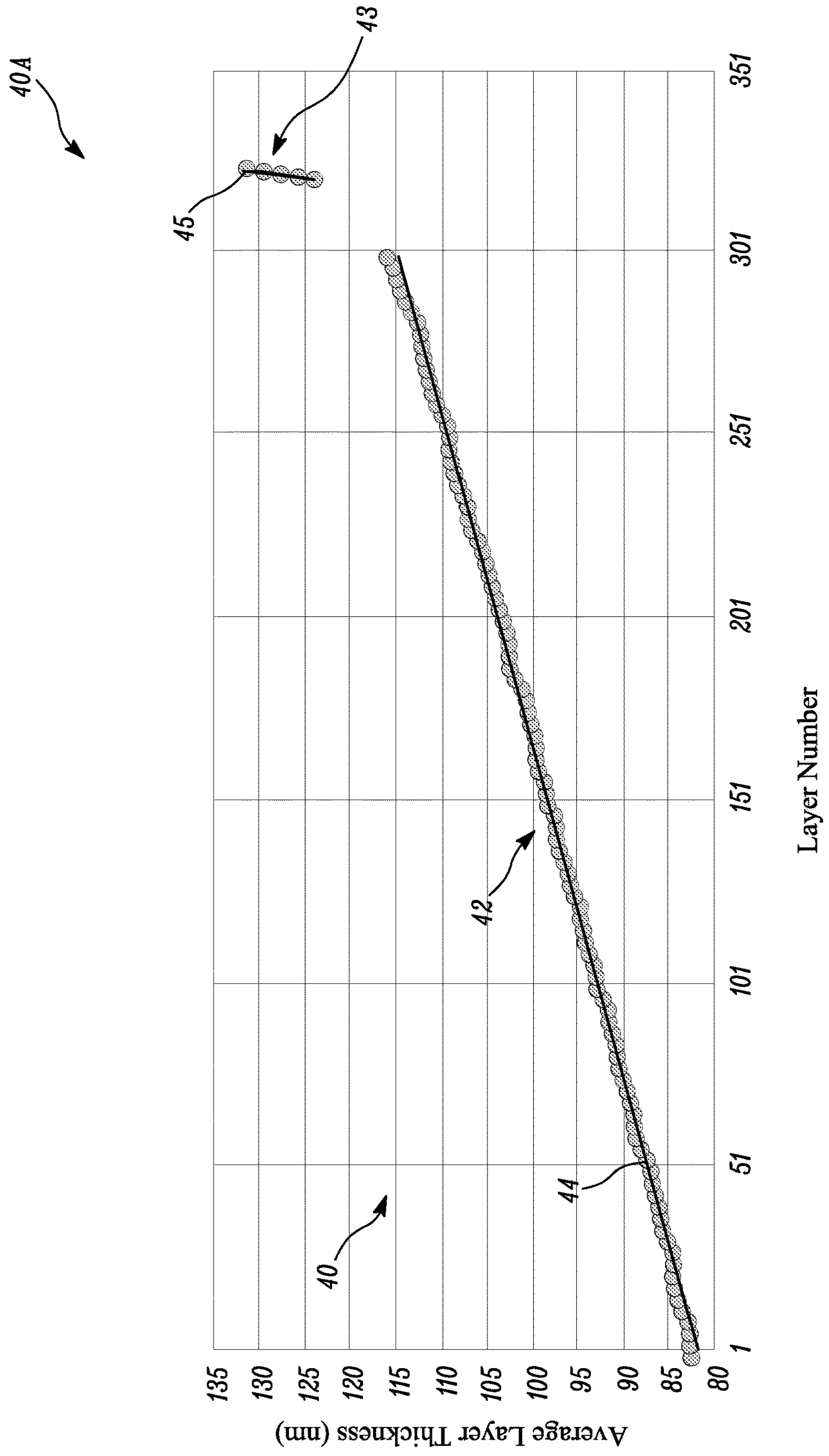
FIG. 4A shows a graph including linear fits to a sequentially arranged polymeric first layers of the reflective polarizer.

FIG. 4A shows a graph 40A including linear fits 44, 45 to the sequentially arranged polymeric first layers 11, 12 in the plot 40. The graph 40A includes average thickness from 80 nm to 135 nm on an axis of ordinates and layer number from 1 to 351 on an axis of abscissas. The graph 40A includes the linear fit 44 to the at least 50 sequentially arranged polymeric first layers 11, 12 in the left region 42. The graph 40A further includes the linear fit 45 to the at least 5 sequentially arranged layers of the polymeric first layers 11, 12 in the right region 43.

The linear fits 44, 45 have respective positive slopes S1 and S2. Specifically, the linear fit 44 to the at least 50 sequentially arranged polymeric first layers 11, 12 in the left region 42 has the slope S1. Further, the linear fit 45 to the at least 5 sequentially arranged layers of the polymeric first layers 11, 12 in the right region 43 has the slope S2. A ratio between the slope S2 and the slope S1 is at least about 5, in accordance with Equation 1 provided below.

$$\frac{S2}{S1} \geq 5 \qquad \text{[Equation 1]}$$

Therefore, the slope S2 is greater than the slope S1. Specifically, the slope S2 is at least 5 times greater than the slope S1. In some embodiments, the ratio between the slope S2 and the slope S1 may be at least about 7, at least about 10, at least about 12, at least about 15, or at least about 18, or at least about 19.

In some embodiments, the linear fits 44, 45 to the at least 50 sequentially arranged polymeric first layers 11, 12 in the left region 42 and to the at least 5 sequentially arranged polymeric first layers 11, 12 in the right region 43 have respective r-squared values R1 and R2. Specifically, the linear fit 44 to the at least 50 sequentially arranged polymeric first layers 11, 12 in the left region 42 has the r-squared value R1. Further, the linear fit 45 to the at least 5 sequentially arranged polymeric first layers 11, 12 in the right region 43 has the r-squared value R2. Each of the r-squared values R1, R2 may also be known as a coefficient of determination, or a coefficient of multiple determination for multiple regression. Each of the r-squared values R1, R2 is a statistical measure to determine how close the plot 40 is fitted to the linear fits 44, 45, respectively. In some embodiments, each of the r-squared values R1, R2 is greater than about 0.8. In some embodiments, each of the r-squared values R1, R2 may be greater than about 0.9. In some embodiments, each of the r-squared values R1, R2 may be greater than about 0.95.

In an example, the linear fit 44 is according to Equation 2 provided below.

$$y = 0.1105x + 81.537 \quad \text{[Equation 2]}$$

In Equation 2, y denotes the average layer thickness t1 and x denotes the layer number. In this example, S1=0.1105 and R1=0.998.

In an example, the linear fit 45 is according to Equation 3 provided below.

$$y = 2.1359x - 561.55 \quad \text{[Equation 3]}$$

In Equation 3, y denotes the average layer thickness t1 and x denotes the layer number. In this example, S2=2.1359 and R2=0.9992. Therefore, S2/S1=19.3294.

Figure 4B:
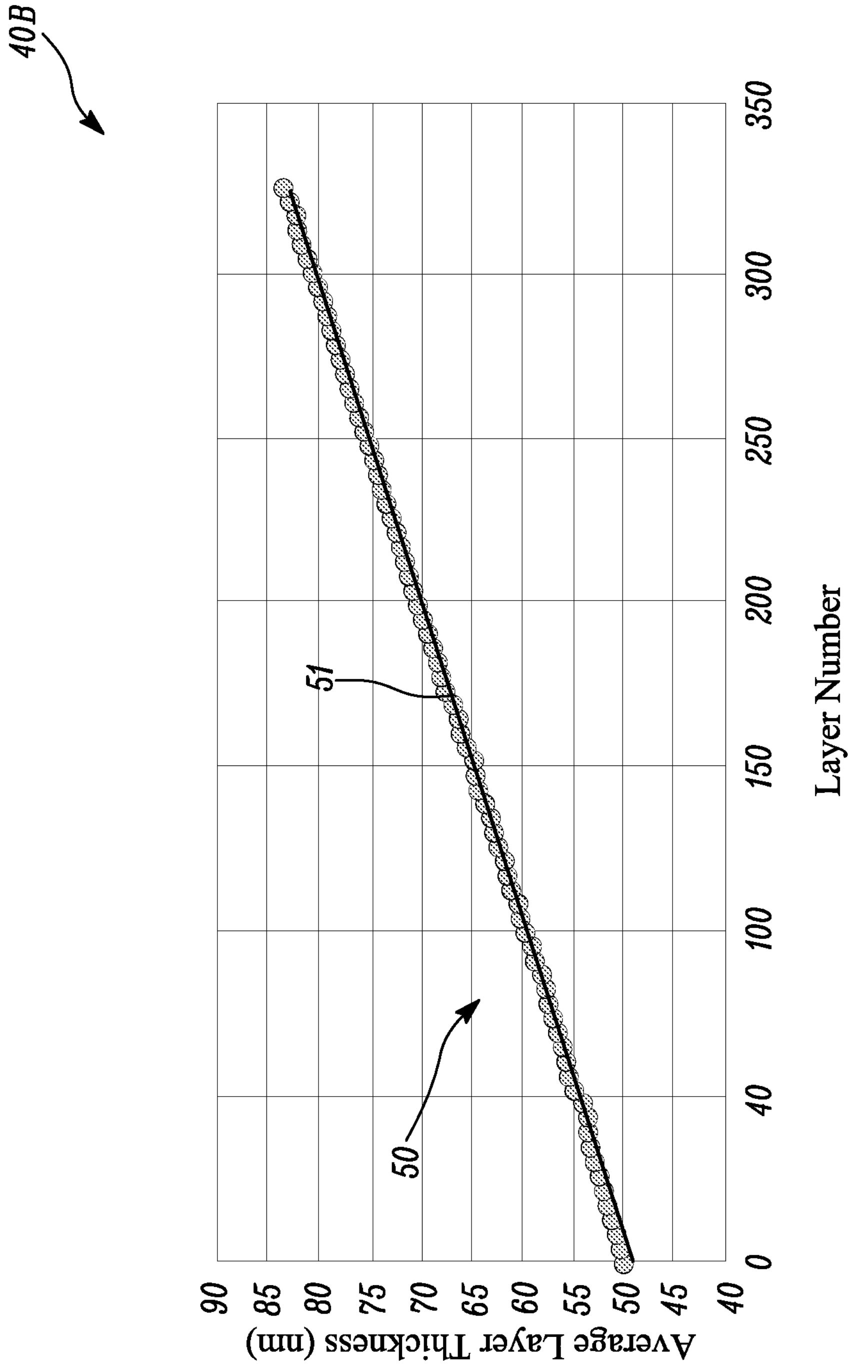
FIG. 4B shows a graph including linear fits to a sequentially arranged polymeric second layers of the reflective polarizer.

FIG. 4B shows a graph 40B including a linear fit 51 to the sequentially arranged polymeric second layers 21, 22 in the plot 50. In some embodiments, the plurality of polymeric second layers 20 includes at least 100 sequentially arranged polymeric second layers 21, 22. However, in some other embodiments, the plurality of polymeric second layers 20 includes at least 150, at least 200, at least 250, or at least 300 sequentially arranged polymeric second layers 21, 22. The graph 40B includes average layer thickness from 40 nm to 90 nm on an axis of ordinates and layer number from 0 to 350 on an axis of abscissas. In some embodiments, the linear fit 51 to the sequentially arranged polymeric second layers 21, 22 has a positive slope S3. The slope S3 has a magnitude of greater than about 0.04 nm per layer number. In some embodiments, the linear fit 51 has a r-squared value R3 of greater than about 0.8. The r-squared value R3 is a statistical measure to determine how close the plot 50 is fitted to the linear fit 51. In some embodiments, the linear fit 51 has the r-squared value R3 of greater than about 0.85, greater than about 0.90, or greater than about 0.95.

In an example, the linear fit 51 is according to Equation 4 provided below.

$$y = 0.1044x + 48.987 \quad \text{[Equation 4]}$$

In Equation 4, y denotes the average layer thickness t2 and x denotes the layer number. In this example, S3=0.1044 and R3=0.9998.

The values of S1, S2, S3, R1, R2 and R3, as stated above, are exemplary in nature and the values may vary based on the properties of the polymeric first and second layers 10, 20.

Figure 5B:
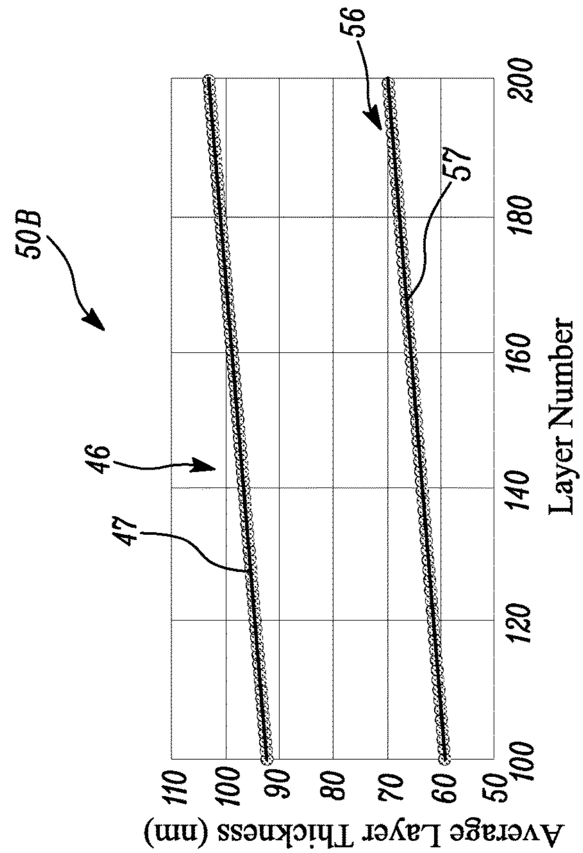
FIGS. 5A-5B show graphs between the average layer thickness and the layer number of the polymeric first and second layers of the reflective polarizer.
Figure 5A:
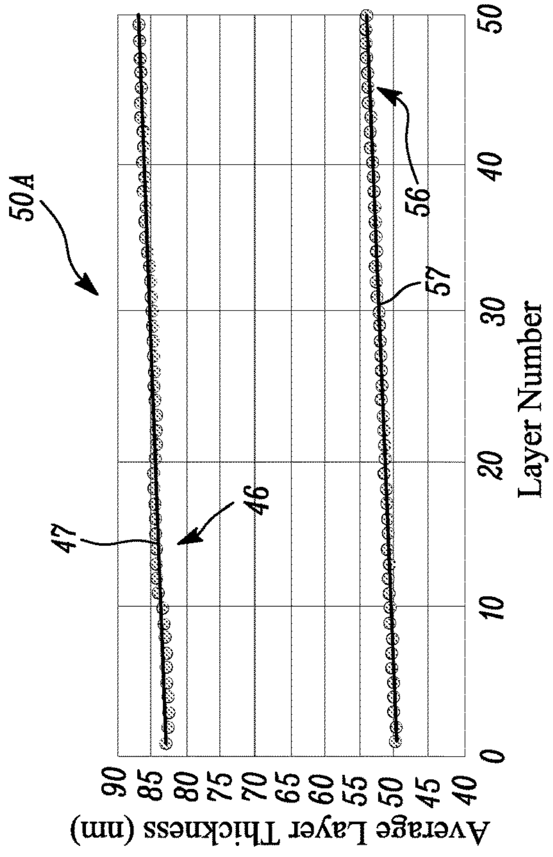

FIGS. 5A-5B show exemplary graphs 50A, 50B, respectively. Each graph 50A, 50B includes average layer thickness on an axis of ordinates and layer number on an axis of abscissas. The graph 50A illustrates the average layer thickness from 40 nm to 90 nm on the axis of ordinates and the layer number from 0 to 50 on the axis of abscissas. The graph 50B illustrates the average layer thickness from 50 nm to 110 nm on the axis of ordinates and the layer number from 100 to 200 on the axis of abscissas.

Both of the graphs 50A, 50B include a plot 46 and a plot 56. The plot 46 is a curve of the average layer thickness t1 versus the layer numbers of the plurality of polymeric first layers 10. The plot 56 is a curve of the average layer thickness t2 versus the layer numbers of the plurality of polymeric second layers 20. In some embodiments, the plots 46, 56 include at least 50 sequentially arranged polymeric layers of the pluralities of polymeric first and second layers 10, 20. In some embodiments, the plots 46, 56 include at least 100, at least 150, at least 200, at least 250, or at least 300 sequentially arranged polymeric layers of the pluralities of polymeric first and second layers 10, 20.

Both of the graphs 50A, 50B further include a linear fit 47 and a linear fit 57. The linear fit 47 to the at least 50 sequentially arranged polymeric first layers 11, 12 in the plot 46 has a positive slope D1. The linear fit 47 corresponds to the linear fit 44 for the sequentially arranged polymeric first layers 11, 12 in the left region 42 of the knee region 41, as illustrated in FIGS. 3A and 4A. The linear fit 57 to the at least 50 sequentially arranged polymeric second layers 21, 22 in the plot 56 has a positive slope D2.

In some embodiments, the slopes D1, D2 are within about 20% of each other. In some embodiments, the slopes D1, D2 may be within about 15%, or within about 10% of each other.

In the illustrated embodiment of FIG. 5A, the positive slopes D1, D2 are within about 6% of each other. In the illustrated embodiment of FIG. 5B, the positive slopes D1, D2 are within about 2.2% of each other.

The linear fits 47 and 57 have respective r-squared values P1, P2. In some embodiments, the r-squared values P1, P2 are greater than about 0.8. In some embodiments, the r-squared values P1, P2 may be greater than about 0.85, greater than about 0.90, or greater than about 0.95.

In an example, the linear fit 47 from layer numbers 1 to 50 is according to Equation 5 provided below.

$$y = 0.0848x + 82.488 \quad \text{[Equation 5]}$$

In Equation 5, y denotes the average layer thickness t1 and x denotes the layer number. In this example, D1=0.0848 and P1=0.9657.

In an example, the linear fit 57 from layer numbers 1 to 50 is according to Equation 6 provided below.

$$y = 0.0902x + 49.474 \quad \text{[Equation 6]}$$

In Equation 6, y denotes the average layer thickness t2 and x denotes the layer number. In this example, D2=0.0902 and P2=0.9978. Further, D1, D2 are within about 6% of each other for layer numbers 1 to 50.

In an example, the linear fit 47 from layer numbers 100 to 200 is according to Equation 7 provided below.

$$y = 0.1084x + 81.534 \quad \text{[Equation 7]}$$

In Equation 7, y denotes the average layer thickness t1 and x denotes the layer number. In this example, D1=0.1084 and P1=0.9657.

In an example, the linear fit 57 from layer numbers 100 to 200 is according to Equation 8 provided below.

$$y = 0.1061x + 48.722 \quad \text{[Equation 8]}$$

In Equation 8, y denotes the average layer thickness t2 and x denotes the layer number. In this example, D2=0.1061 and P2=0.9998. Further, D1, D2 are within about 2.2% of each other for layer numbers 100 to 200.

The values of D1, D2, P1 and P2, as stated above, are exemplary in nature and the values may vary based on the properties of the polymeric first and second layers 10, 20.

It may be apparent from FIGS. 5A and 5B, that the rate of change of average layer thickness relative to layer number for the polymeric first layers 10 and the rate of change of average layer thickness relative to layer number for the polymeric second layers 20 are within a certain range of each other (e.g., within about 20%) before the knee region 41 (shown in FIG. 3A).

Figure 6A:
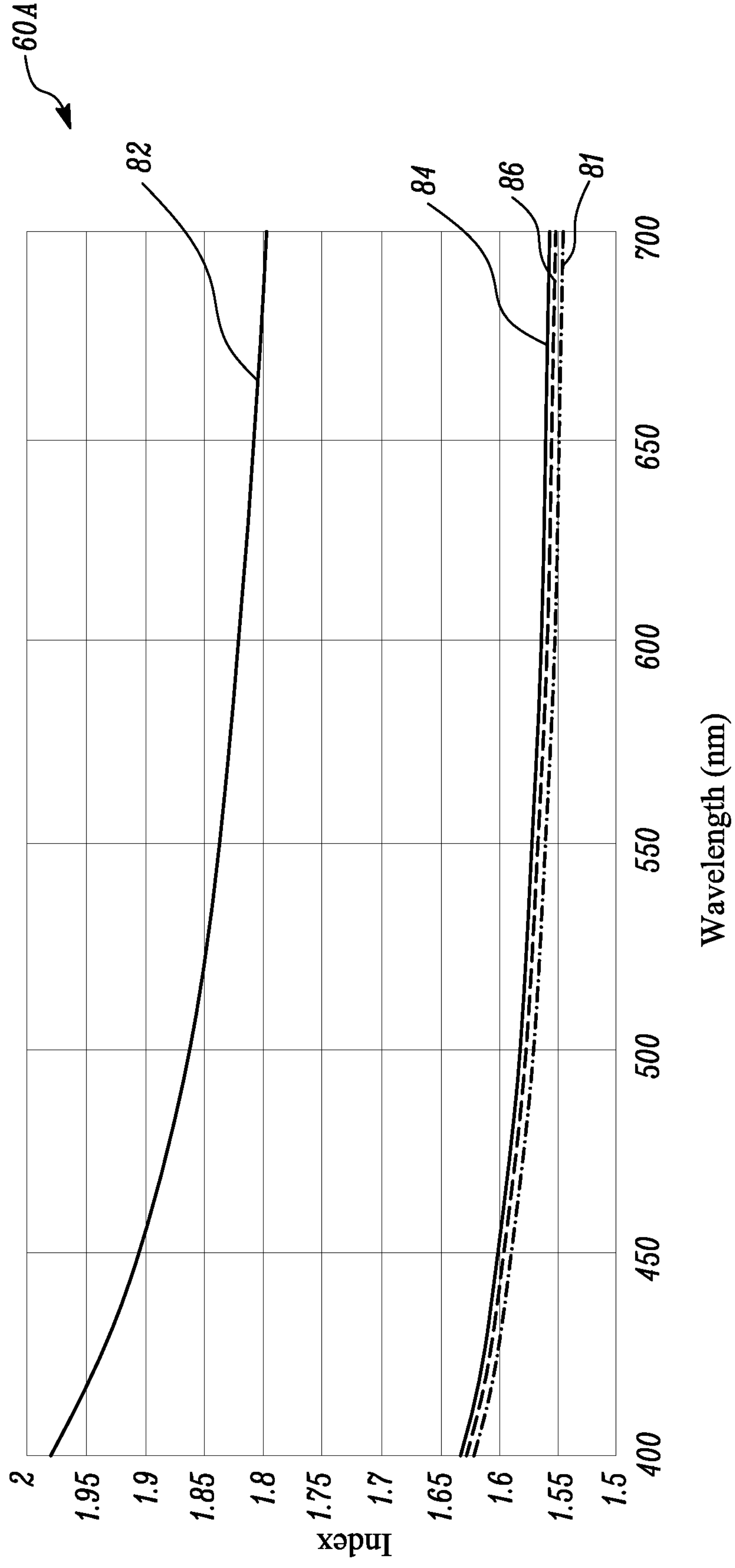
FIGS. 6A-6C show graphs between indices of 'A' and 'B' polymeric layers of the reflective polarizer and wavelengths of an incident light in a first wavelength range.

FIG. 6A shows an exemplary graph 60A. The graph 60A includes index on an axis of ordinates and wavelength on an axis of abscissas. The wavelengths are in a range extending from 400 nm to 700 nm.

The graph 60A includes a curve 81, a curve 82, a curve 84, and a curve 86. The curve 81 depicts an average refractive index navg for each 'A' polymeric layer. The average refractive index navg corresponds to an average of indices nx, ny and nz for each 'A' polymeric layer. For a given wavelength, navg=(nx+ny+nz)/3. The average refractive index navg is considered for each 'A' polymeric layer as each 'A' polymeric layer is made of an isotropic material. As such, a maximum variation between the indices nx, ny, nz of each 'A' polymeric layer in the wavelength range from 400 nm to 700 nm is very small (e.g., less than about 0.05). The curve 82 depicts the index nx of each 'B' polymeric layer the along the x-axis. The curve 84 depicts the index ny of each 'B' polymeric layer along the y-axis. The curve 86 depicts the index nz of each 'B' polymeric layer along the z-axis. The curves 82, 84, 86 show the indices ny and nz are lower than the index nx. The curves 84, 86 are close to each other. In other words, indices ny and nz of each 'B' polymeric layer are substantially matched with each other. The stretching of the 'A' and 'B' polymeric layers and simultaneously relaxing the 'A' and 'B' polymeric layers may allow the indices in the 'A' and 'B' polymeric layers to match very well in the non-stretch directions, such as the MD and the ND. Thus, the indices ny and nz of the 'A' and 'B' polymeric layers in the two non-stretch directions, such as the MD and the ND, may be substantially matched with each other. Referring to FIG. 6A, the average refractive index navg of 'A' polymeric layers substantially matches the indices ny and nz of 'B' polymeric layers. In some embodiments, the curve 84 and the curve 86 may coincide with each other. Further, the curve 82 is not matched with the curves 84, 86. Thus, the index nx of the 'B' polymeric layers in the stretch direction, such as the TD, is not substantially matched or mismatched with the indices ny and nz of the 'B' polymeric layers in the stretch direction, such as the TD. Therefore, there is substantial mismatch between the index nx of the 'A' polymeric layers with the index nx of the 'B' polymeric layers in the stretch direction, such as the TD. Referring to FIG. 6A, the average refractive index navg of the 'A' polymeric layers does not match with the index nx of the 'B' polymeric layers.

Figure 6B:
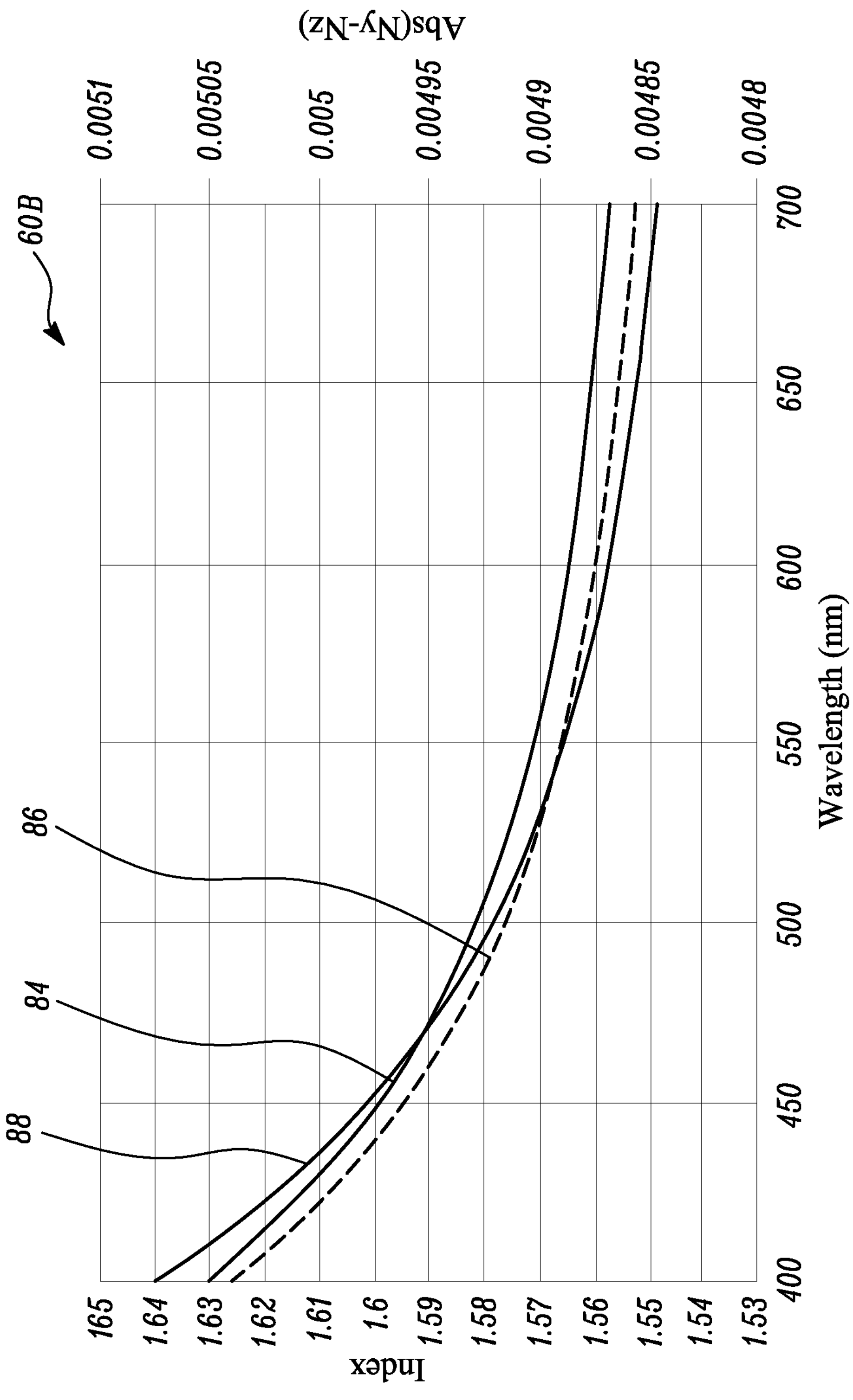

FIG. 6B shows an exemplary graph 60B. The graph 60B includes index on a left side of an axis of ordinates and magnitude of a difference between the index ny and the index nz of the 'B' polymeric layers on a right side of the axis of ordinates. The graph 60B includes wavelength on an axis of abscissas.

The graph 60B includes the curves 84, 86 of the indices ny and nz, respectively, of the 'B' polymeric layers. The graph 60B further includes a curve 88 that depicts a magnitude of a difference between the indices ny and nz of the 'B' polymeric layers. It may be apparent from the graph 60B of FIG. 6B, the magnitude of the difference between the indices ny and nz of the 'B' polymeric layers is less than about 0.0051 ((i.e., $|nx-ny|_B<0.0051$). In other words, the indices ny and nz of each 'B' polymeric layer are substantially matched with each other. Further, as shown in FIG. 6B, the magnitude of the difference between the indices ny and nz of the 'B' polymeric layers decreases with an increase in wavelength. In other words, $|ny-nz|_B$ is inversely proportion to wavelength.

Figure 6C:
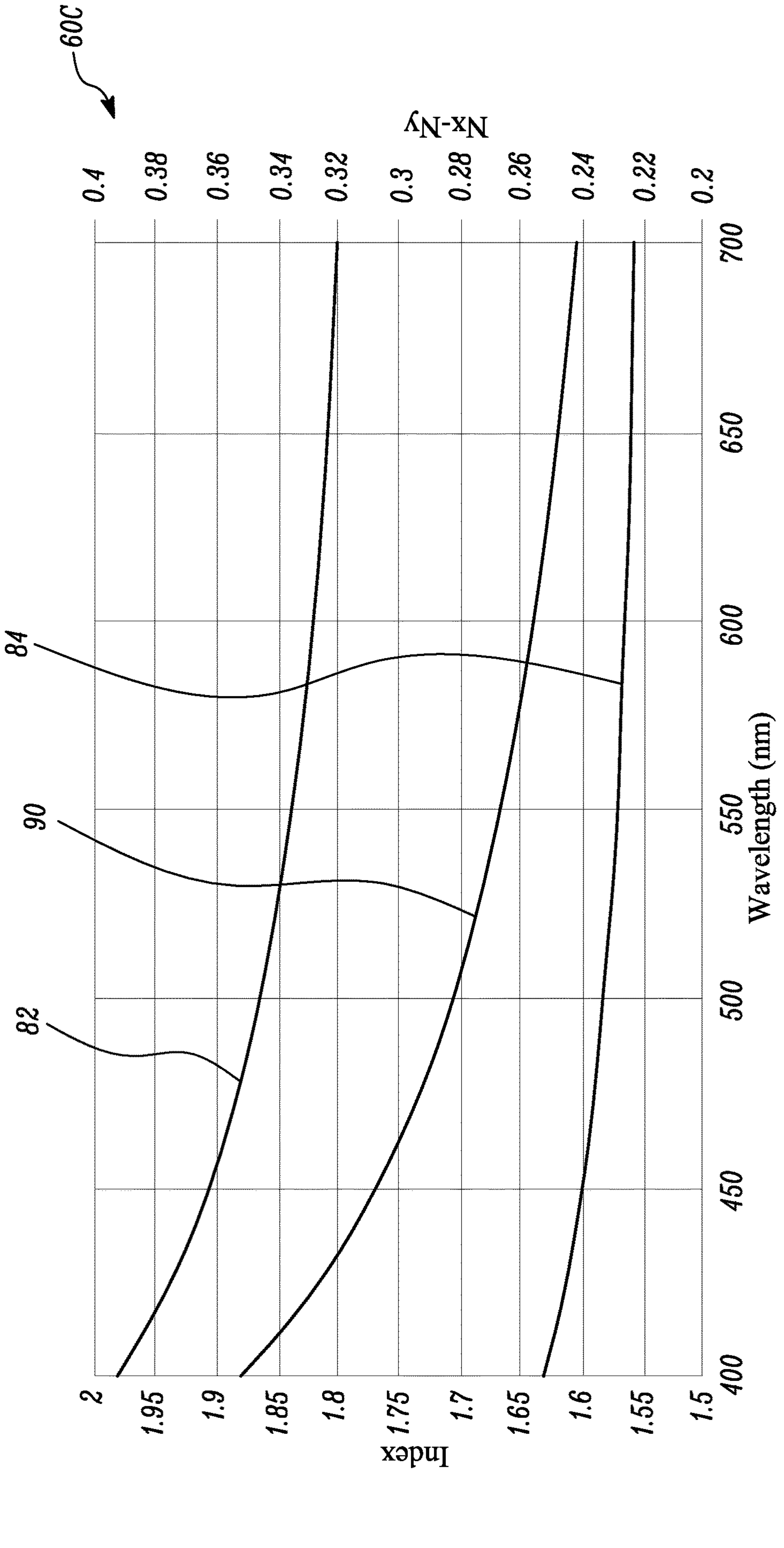

FIG. 6C shows an exemplary graph 60C. The graph 60C includes index on a left side of an axis of ordinates and magnitude of a difference between the index nx and the index ny of the 'B' polymeric layers on a right side of the axis of ordinates. The graph 60C includes wavelength on an axis of abscissas.

The graph 60C includes the curve 82 of the index nx and the curve 84 of the index ny corresponding to the polymeric 'B' layers. The graph 60C further includes a curve 90 that depicts a difference between the indices nx and ny of the 'B' polymeric layers. It may be apparent from the graph 60C of FIG. 6C, the difference between the indices nx and ny of the 'B' polymeric layers is at least 0.2 (i.e., $(nx-ny)_B\geq0.2$). Specifically, the difference between the indices nx and ny of the 'B' polymeric layers is greater than about 0.24 and less than about 0.36. Further, as shown in FIG. 6C, the difference between the indices nx and ny of the 'B' polymeric layers decreases with an increase in wavelength. In other words, $(nx-ny)_B$ is inversely proportion to wavelength.

Referring to FIGS. 1, and 6A-6C, each 'A' and 'B' polymeric layer have the index nx, the index ny, and the index nz, such that for at least a first wavelength in a predetermined wavelength range extending from about 400 nm to about 600 nm, a magnitude of a difference between a maximum index in a group of indices formed of the indices nx, ny and nz of the 'A' polymeric layers and the indices ny and nz of the 'B' polymeric layers, and a minimum index in the group of indices is less than about 0.02.

$$|[\max(\text{group of indices})]-[\min(\text{group of indices})]| \leq 0.02 \quad \text{[Equation 9]}$$

where, the group of indices includes indices nx, ny and nz of the 'A' polymeric layers and the indices ny and nz of the 'B' polymeric layers, as provided below.

$$(\text{group of indices}) = [(nx, ny, nz)A + (ny, nz)B] \quad \text{[Equation 10]}$$

In some embodiments, for at least the first wavelength in the predetermined wavelength range extending from about 400 nm to about 600 nm, the magnitude of the difference between the maximum index in the group of indices formed of the indices nx, ny and nz of the 'A' polymeric layers and the indices ny and nz of the 'B' polymeric layers, and the minimum index in the group of indices is less than about 0.01, less than about 0.007, less than about 0.006, or less than about 0.005.

In some embodiments, a magnitude of a difference between the index ny and the index nz of the 'B' polymeric layers at a second wavelength, greater than the first wavelength, in the predetermined wavelength range is less than the magnitude of the difference between the index ny and the index nz of the 'B' polymeric layers at the first wavelength. In other words, the magnitude of the different between the indices ny and nz of the 'B' polymeric layers is less for the second wavelength than for the first wavelength.

In some embodiments, for at least the first wavelength in the predetermined wavelength range extending from about 400 nm to about 600 nm, a difference between the index nx of the 'B' polymeric layers and the index nx of the 'A' polymeric layers is greater than about 0.1. However, in some embodiments, the magnitude of the difference between the index nx of the 'B' polymeric layers and the index nx of the 'A' polymeric layers may be greater than about 0.15, or greater than about 0.2.

Figure 7A:
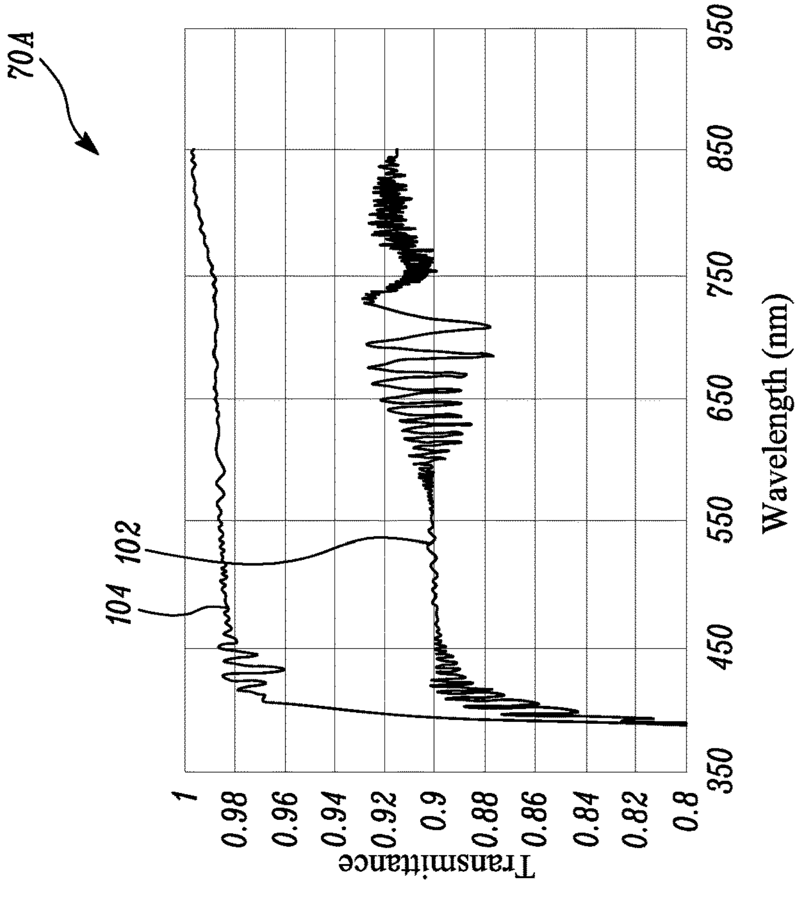
FIG. 7A shows a graph between an optical transmittance of the reflective polarizer and a wavelength range for a second polarization state.
Figure 7B:
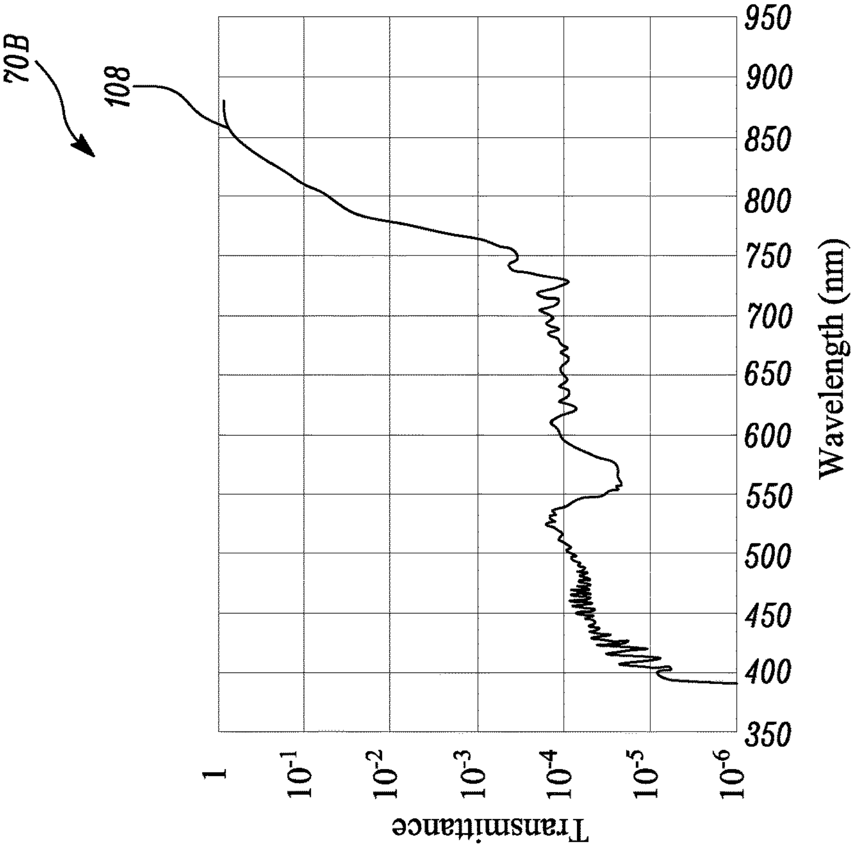
FIG. 7B shows a graph between an optical transmittance of the reflective polarizer and a wavelength range for a first polarization state.

FIGS. 7A and 7B show exemplary graphs 70A and 70B, respectively. The graphs 70A and 70B include optical transmittance on an axis of ordinates and wavelength on an axis of abscissas. In FIG. 7A, the optical transmittance is expressed in a scale from 0.8 to 1 in the axis of ordinates. In FIG. 7B, the optical transmittance is expressed in a scale from $10^{-6}$ to 1 in the axis of ordinates.

Now referring to FIGS. 1 and 7A-7B, the graphs 70A and 70B depict an optical transmittance versus wavelength for a light incident on the pluralities of the polymeric first and second layers 10, 20.

The graph 70A includes two curves 102, 104. The curves 102, 104 depict the optical transmittance of the pluralities of the polymeric first and second layers 10, 20. Specifically, the curve 104 shows an optical transmittance of the pluralities of the polymeric first and second layers 10, 20 for the second polarization state or the pass polarization state and an incident light with an angle of incidence of about 60 degrees. The curve 102 shows an optical transmittance of the polymeric first and second layers 10, 20 for the second polarization state or the pass polarization state and a normally incident light. In this example, the optical transmittance of the pluralities of the polymeric first and second layers 10, 20 for an incident light having the angle of incidence of about 60 degrees and the second polarization state (for example, P-Polarization state) is higher than the optical transmittance of the polymeric first and second layers 10, 20 for a normally incident light having the second polarization state. This is because an incident light reflectivity varies with an angle of incidence at the air-polymer interfaces (for example, air-polymer interfaces adjacent to the skin layers 62 and 63, as shown in FIG. 1) and the reflectivity of the pluralities polymeric first and second layers 10, 20. As is apparent from the curve 104 of the graph 70A, for a first wavelength range extending from about 400 nm to about 700 nm, the pluralities of the polymeric first and second layers 10, 20, in combination have, for the second polarization state and an incident angle θ of between about 55 degrees to about 65 degrees, an average optical transmittance of greater than about 95%. In some other embodiments, for the first wavelength range, the pluralities of the polymeric first and second layers 10, 20, in combination have, for the second polarization state and an incident angle θ of between about 55 degrees to about 65 degrees, an average optical transmittance of greater than about 96%, greater than about 97%, greater than about 98%, or greater than about 99%. Further, for the first wavelength range extending from about 400 nm to about 700 nm, the pluralities of the polymeric first and second layers 10, 20 in combination have, for the second polarization state and an incident angle θ of between about 55 degrees to about 65 degrees, an average optical reflectance of less than about 1%, and an average optical absorption of less than about 1%. In some embodiments, the pluralities of the polymeric first and second layers 10, 20, in combination have, for the second polarization state and an incident angle θ of between about 55 degrees to about 65 degrees, an average optical reflectance of less than about 0.5%, less than about 0.3%, or less than about 0.2%. An incident angle θ of between about 55 degrees to about 65 degrees may approximately correspond to an angle of incidence of about 60 degrees. Further, for the first wavelength range extending from about 400 nm to about 700 nm, the pluralities of the polymeric first and second layers 10, 20, in combination have, for the second polarization state and an incident angle θ of less than about 5 degrees, an average optical transmittance of greater than about 85%. In some other embodiments, for the first wavelength range, the pluralities of the polymeric first and second layers 10, 20, in combination have, for the second polarization state and an incident angle θ of less than about 5 degrees, an average optical transmittance of greater than about 86%, greater than 87%, or greater than about 88%. An incident angle θ of less than about 5 degrees may approximately correspond to an angle of incidence of about 0 degrees.

The graph 70B includes a curve 108. The curve 108 depicts optical transmittance of the pluralities of the polymeric first and second layers 10, 20 for the first polarization state or the block polarization state and a normally incident light. The optical reflectance is substantially complementary to the optical transmittance, i.e., optical reflectance=(1−optical transmittance).

As apparent from the graph 70B, the optical transmittance of the pluralities of the polymeric first and second layers 10, 20 for the first polarization state and a normally incident light is very low. Specifically, for the first wavelength range extending from about 400 nm to about 700 nm, the pluralities of the polymeric first and second layers 10, 20, in combination have, for the first polarization state and an incident angle θ of less than about 5 degrees, an average optical reflectance of greater than about 95%, an average optical transmittance of less than about 1%, and an average optical absorption of less than about 1%. In some other embodiments, for the first wavelength range, the pluralities of the polymeric first and second layers 10, 20, in combination have, for the first polarization state and an incident angle θ of less than about 5 degrees, an average optical reflectance of greater than about 97%, greater than about 98%, or greater than about 99%. In some embodiments, the pluralities of the polymeric first and second layers 10, 20, in combination have, for the first polarization state and an incident angle θ of less than about 5 degrees, an average optical transmittance of less than about 0.2%, less than about 0.1%, or less than about 0.05%. Further, for the first wavelength range extending from about 400 nm to about 700 nm, the pluralities of the polymeric first and second layers 10, 20, in combination have, for the first polarization state and an incident angle θ of between about 55 degrees to about 65 degrees, an average optical reflectance of greater than about 85%. In some other embodiments, for the first wavelength range, the pluralities of the polymeric first and second layers 10, 20, in combination have, for the first polarization state and an incident angle θ of between about 55 degrees to about 65 degrees, an average optical reflectance of greater than about 87%, or greater than about 88%, or greater than about 90%. An incident angle θ of less than about 5 degrees may be substantially normal to the reflective polarizer 200. Further, an incident angle θ of between about 55 degrees to about 65 degrees may approximately correspond to an angle of incidence of about 60 degrees.

Therefore, the reflective polarizers 200, 200' have a very low transmission in the block polarization state and a very low reflectivity in the pass polarization state. These optical properties of the reflective polarizers 200, 200' may help to achieve high contrast ratio in display devices and may also help to reduce optical artifacts such as "ghosting". A wrinkle-free reflective polarizer with the very low reflectivity in the pass polarization state and the very low transmissivity in the block polarization state may be used in high performance optical applications, such as in the VR headsets.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A reflective polarizer comprising:

a plurality of polymeric first layers disposed between a pair of polymeric first end layers and a plurality of polymeric second layers disposed between a pair of polymeric second end layers, each layer between the pair of polymeric first end layers and each layer between the pair of polymeric second end layers having an average thickness less than about 300 nanometers (nm), each of the polymeric second end layers physically contacting an adjacent layer having an average thickness greater than about 500 nm; and at least one intermediate layer having an average thickness greater than about 500 nm disposed between the pluralities of polymeric first and second layers, one of the polymeric second end layers physically contacting a first layer of the at least one intermediate layer, the other of the polymeric second end layers physically contacting a skin layer having an average thickness greater than about 500 nm, such that for a first wavelength range extending from about 400 nm to about 700 nm, the pluralities of the polymeric first and second layers, in combination, have:

for a first polarization state and an incident angle of less than about 5 degrees: an average optical reflectance of greater than about 95%, an average optical transmittance of less than about 1%, and an average optical absorption of less than about 1%;

for an orthogonal second polarization state and an incident angle of between about 55 degrees to about 65 degrees: an average optical transmittance of greater than about 95%, an average optical reflectance of less than about 1%, and an average optical absorption of less than about 1%; and for the first polarization state and an incident angle of between about 55 degrees to about 65 degrees: an average optical reflectance of greater than about 85%, wherein a plot of the average thickness versus a layer number for the plurality of polymeric first layers comprises a knee region separating a left region from a right region such that a rate of increase of the average layer thickness of the plurality of polymeric first layers is substantially greater in the right region than in the left region, and wherein a plot of the average layer thickness versus a layer number for the plurality of polymeric second layers has a substantially constant slope.

2. The reflective polarizer of claim 1, wherein each of the pluralities of polymeric first and second layers forms alternating A and B polymeric layers, each A and B polymeric layer having an average thickness less than about 300 nm, an index nx along the first polarization state, an index ny along the orthogonal second polarization state, and an index nz along a z-axis orthogonal to the first and second polarization states, such that for at least the first wavelength in a predetermined wavelength range extending from about 400 nm to about 600 nm:

a magnitude of a difference between a maximum index in a group of indices formed of the indices nx, ny and nz of the A polymeric layers and the indices ny and nz of the B polymeric layers, and a minimum index in the group of indices is less than about 0.02; and a magnitude of a difference between the index nx of the A and B polymeric layers is greater than about 0.1.

3. The reflective polarizer of claim 1, wherein the left region comprises at least 50 sequentially arranged polymeric first layers where the polymeric first layers have lower layer numbers and the average thickness increases with increasing layer number, and the right region comprises at least 5 sequentially arranged polymeric first layers where the polymeric first layers have higher layer numbers and the average thickness increases with increasing layer number, such that linear fits to the at least 50 sequentially arranged polymeric first layers in the left region and to the at least 5 sequentially arranged polymeric first layers in the right region have respective positive slopes S1 and S2, S2/S1≥5, wherein the polymeric second layers comprise at least 100 sequentially arranged polymeric second layers, and wherein in the plot of the average thickness versus a layer number of the plurality of polymeric second layers, a linear fit to the polymeric second layers has a positive slope having a magnitude of greater than about 0.04 nm per layer number with an r-squared value of greater than about 0.8.

4. The reflective polarizer of claim 1, wherein the pluralities of the polymeric first and second layers, in combination, have, for the second polarization state and an incident angle of between about 55 degrees to about 65 degrees, an average optical transmittance of greater than about 99%.

5. The reflective polarizer of claim 1, wherein the pluralities of the polymeric first and second layers, in combination, have, for the second polarization state and an incident angle of between about 55 degrees to about 65 degrees, an average optical reflectance of less than about 0.5%.

* * * * *